United States Patent [19]
Tsuda

[11] Patent Number: 4,672,460
[45] Date of Patent: Jun. 9, 1987

[54] FACSIMILE APPARATUS

[75] Inventor: Shin Tsuda, Yokohama, Japan

[73] Assignee: Canon Kabushiki Kaisha, Tokyo, Japan

[21] Appl. No.: 588,806

[22] Filed: Mar. 12, 1984

[30] Foreign Application Priority Data

Mar. 30, 1983 [JP] Japan .................................. 58-52785
Apr. 1, 1983 [JP] Japan .................................. 58-55162

[51] Int. Cl.⁴ ........................ H04N 1/32; H04N 1/40
[52] U.S. Cl. ................................... 358/257; 358/280; 358/286; 340/825.06; 340/825.14; 370/61
[58] Field of Search ............... 358/256, 257, 280, 286, 358/260, 296; 370/61; 340/825.06, 825.15, 825.44

[56] References Cited

U.S. PATENT DOCUMENTS

| | | | |
|---|---|---|---|
| 3,591,711 | 7/1971 | Groat | 358/280 |
| 4,112,467 | 9/1978 | Ogawa | 358/257 |
| 4,131,915 | 12/1978 | Nakagome et al. | 358/260 |
| 4,153,916 | 5/1979 | Miwa et al. | 358/257 |
| 4,280,144 | 7/1981 | Bacon | 358/280 |
| 4,386,373 | 5/1983 | Kondo et al. | 358/260 |

Primary Examiner—Howard W. Britton
Assistant Examiner—John K. Peng
Attorney, Agent, or Firm—Fitzpatrick, Cella, Harper & Scinto

[57] ABSTRACT

A memory for storing an image data is provided in a receiver of a facsimile apparatus and an information amount of the image data stored in the memory is informed to a transmitter of the facsimile apparatus. The transmission rate of the image data transmitted by the facsimile transmitter is controlled in accordance with the information amount of the image data stored in the memory of the facsimile receiver to efficiently transmit the image data. By providing the memory in the facsimile receiver, sending of a dummy bit by the facsimile transmitter is unnecessary and the transmission time of the image data is shortened.

11 Claims, 8 Drawing Figures

FACSIMILE APPARATUS

BACKGROUND OF THE INVENTION

1. Field of the Invention

The present invention relates to a facsimile apparatus which has a memory for storing image data in a facsimile receiver to shorten image data transmission time and allow an efficient image processing.

2. Description of the Prior Art

In a prior art facsimile apparatus, because of combined use of apparatus of different processing speeds, it is a common practice to match data processing speeds of a transmitter and a receiver prior to transmission of the image data in order to establish a communication channel. Since it is meaningless to transmit the image data at a transmission speed higher than the processing speed of a decoder or recorder in the receiver, it is a common method to adjust the transmission rate of the transmitter to comply with the processing speed of the receiver.

In the adjustment, a minimum transmission time defined in the CCITT (Consulting Committee of International Telegram and Telephone) Recommendation T30 is used as a reference. As described in the Recommendation, the minimum transmission time is a transmission time of one unit of code length (code length of one scan line for the facsimile apparatus).

The minimum transmission time is defined by the following reason. It is not difficult using a present data communication technique to transmit data at a transmission rate of 9600 bps while using an MH (modified Huffmann) encoding system which is common as a redundancy compression system. In this case, a minimum transmission time of 3-4 ms is possible. However, because old type or low cost machines having longer minimum transmission time are also used, the minimum transmission time is selected from 0 ms, 5 ms, 10 ms and 20 ms in the pretransmission procedure of the CCITT Recommendation in accordance with th processing capability of the receiver in order to assure the transmission compatibility so that the processing time of the receiver is assured.

In order to meet the requirement for the minimum transmission time and assure the processing time of the receiver, dummy bits are added to each line of code bits in the transmitter so that the transmission rate of one line does not exceed the processing capability of the receiver. This means that the telephone fee charged to the transmitter is higher due to the dummy bits if the receiver has a lower processing capability than the transmission capability of the transmitter.

In the present situation where the technology rapidly advances, it may be anticipated that the record speed of the receiver is faster than the transmission rate of the transmitter. In such a case, the faster unit should be operated to comply with the slower unit.

Thus, if the image data is transmitted in a manner to comply with the CCITT Recommendation, a device having a high transmission capability due to the advancement of the technology cannot perform with its full capability unless other devices have the same capability, or it can communicate with an old type or low cost device only at the low rate of the old type device.

SUMMARY OF THE INVENTION

It is an object of the present invention to provide a facsimile apparatus which can transmit image data efficiently between a facsimile transmitter and a facsimile receiver having different image data processing speeds from each other.

It is another object of the present invention to provide a facsimile apparatus which eliminates the need to transmit dummy data to shorten transmission time and reduce the telephone fee.

It is another object of the present invention to provide a facsimile apparatus which can shorten the image data transmission time even when the minimum transmission time of a receiver is short.

DETAILED DESCRIPTION OF THE PREFERRED EMBODIMENTS

Figure 1:
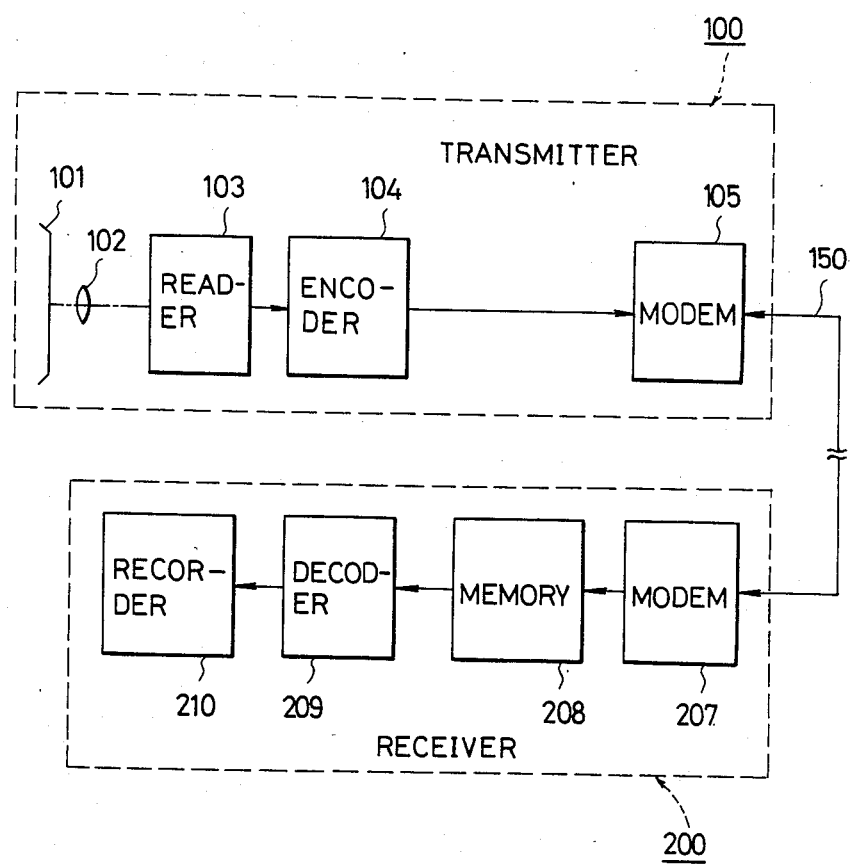
FIG. 1 is a block diagram showing a configuration of a transmitter/receiver of a facsimile apparatus of the present invention.

FIG. 1 shows a block diagram of a facsimile apparatus of the present invention. FIG. 1 shows a transmitter/receiver of the facsimile apparatus. In a transmitter 100, image information on an original document 101 is read by a reader 103 such as a CCD sensor through an optical system 102. The image information read by the reader 103 is encoded by an encoder 104. The encoding system may be the MH system or MR (modified READ) system. The coded image information is sent to a modem 105 where it is modulated and sent out to a line 150. The above image transmission operation is controlled by a controller (not shown) such as a microcomputer.

The signal transmitted to a receiver 200 through the line 150 is demodulated by a modem 207 and temporarily stored in a memory 208. The stored undecoded information is sequentially read out in accordance with the processing status of a decoder 209 and a recorder 210, decoded by the decoder 209 and recorded on a record paper by the recorder 210 such as a thermal printer. The above receiving operation is also controlled by the controller.

Figure 2A:
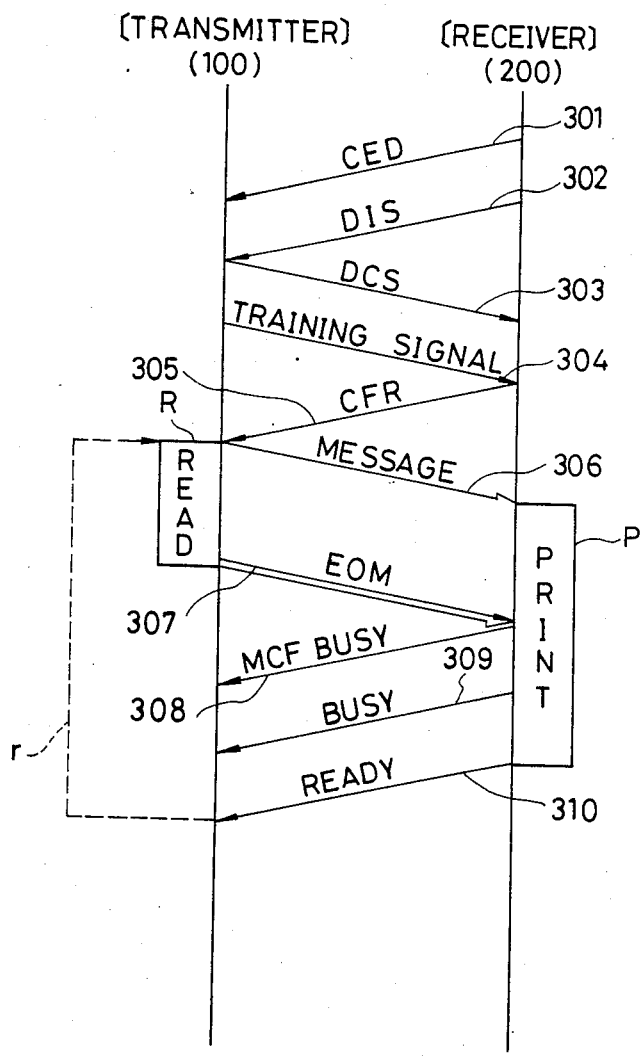
FIGS. 2A and 2B show transmission protocols of the facsimile apparatus.
Figure 2B:
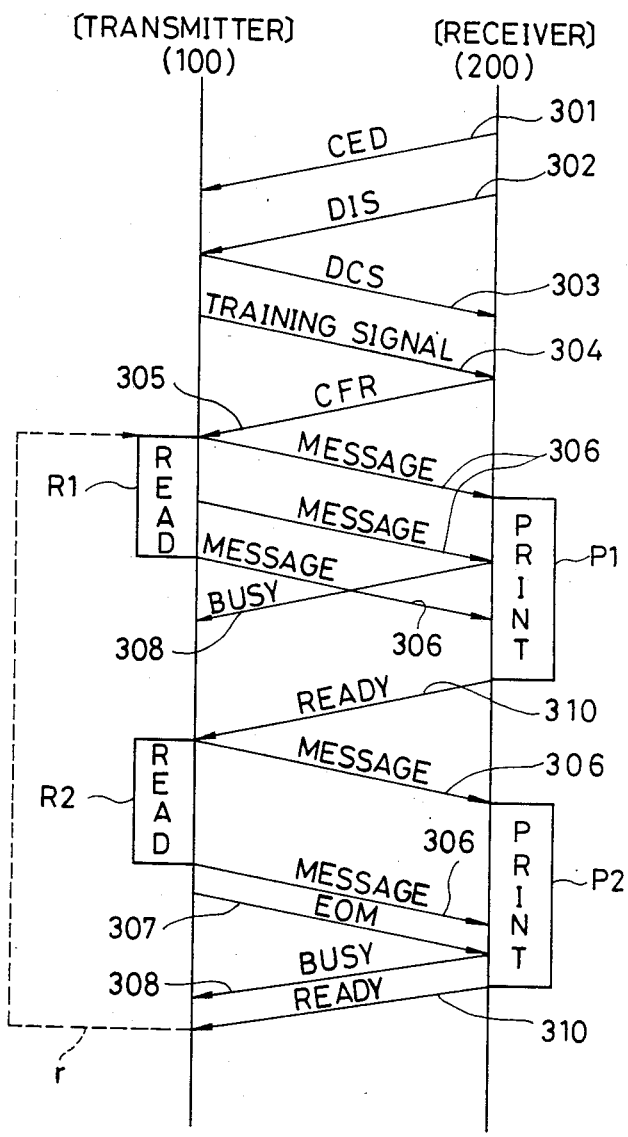
Figure 3:
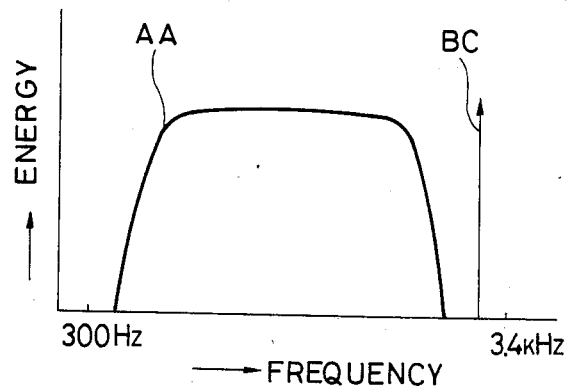
FIG. 3 is a graph of a frequency band for explaining a backward channel.

The facsimile apparatus of FIG. 1 transmits the image information in a manner shown in FIGS. 2A and 2B. FIG. 2A diagramatically shows signals exchanged between the transmitter 100 and the receiver 200. Arrows show directions of signal blows. In the following description, the signals described in the CCITT Recommendation are shown only by their names and the explanation thereof is omitted.

In FIG. 2A, in response to a calling signal (not shown), a CED (called equipment discrimination) signal 301 and a DIS (digital identification signal) signal 302 are sent from the receiver 200.

In response to those signals, A DCS (digital command signal) signal 303 and a training signal 304 are sent from the transmitter 100. By the DCS signal 303 and the training signal 304, the transmitter checks if the receiver 200 can receive the data at the transmission rate of the transmitter 100. This procedure is known from the CCITT Recommendation.

When the receiver 200 successes the training, the receiver 200 sends a CFR (confirmation for reception) signal 305.

Then, an image message 306 is sent from the transmitter. The image message has been encoded by the encoder 104 and modulated by the modem 105. In parallel to the message transmission, the transmitter 100 reads the image by the reader 103 as shown by R. One line of image information is sent out to the line 150 in a time substantially the same as a read time. In the present invention, no dummy bit is added, unlike the prior art apparatus. When the image message is sent out, an EOM (end of message) signal 307 is added at each end of one document of message.

On the other hand, the data received by the receiver 200 is temporarily stored in the memory 208 having a memory capacity corresponding to one document, and it is sequentially read out in accordance with the processing status of the decoder 209 and the recorder 210 to decode and record the data. In this case, the processing speeds of the decoder 209 and the recorder 210 do not meet the minimum transmission time of zero, and the record operation is delayed by the memory read operation as shown by P and continues even after the EOM signal 307 is sent from the transmitter 100.

If the receiver 200 correctly receives the data from the transmitter 100, it sends out an MCF (message confirmation) signal and a BUSY signal 308 when it receives the EOM signal 307. The BUSY signal indicates that data remains in the memory 208 of the receiver and the reception of new data is not accepted. As shown by 309, the data may be continuously transmitted so long as the readout from the memory 208 and the record operation continue.

The receiver 200 sends a READY signal 310 at the end of the data readout from the memory 208 and the record operation by the recorder 210, or at the expected time therefor to prepare for the next image message. Thereafter, if the next original document is present, the transmitter 100 reads the next original document as shown by r and transmits it.

If the memory capacity of the memory 208 of the receiver 200 is smaller than one page of document, the communication is carried out in a manner shown in FIG. 2B.

In response to a calling signal (not shown), the receiver 200 sends a CED signal 301 and a DIS signal 302.

In response to those signals, the transmitter 100 sends a DCS signal 303 and a training signal 304. By the DCS signal 303 and the training signal 304, it is determined whether the receiver 200 can receive the data at the transmission rate of the transmitter 100. These steps are identical to those described above.

If the receiver 200 successes the training, the receiver sends a CFR (confirmation of reception) signal 305.

Then, the transmitter sends an image message 306. If the memory 208 is likely to overflow because of insufficient vacant area in the course (shown by P1) of writing of the message to the memory 208 and recording thereof, the receiver 200 sends a BUSY signal 308. In response thereto, the transmitter 100 interrupts the read and record operation (R1). It is desirable that the BUSY signal is sent at a timing sufficiently in advance of the overflow of the memory 208 by the data transmitted by the transmitter 100 to permit it to decode the BUSY signal and stop the transmission.

The receiver 200 sends a READY signal 310 at the end of the record operation of the recorder 210 or the expected time therefor to prepare for the following image message.

As soon as the transmitter 100 receives the READY signal 310, it sends the remaining image message 306. The transmission is carried out in parallel to the read operation as shown by R2. Unless the transmitter 100 again receives the BUSY signal, it continuously sends the image message. The image message 306 is temporarily stored in the memory 208 as shown by P2 and then it is read out and recorded.

When the transmitter 100 sends the remaining image message, it adds the EOM signal 307 to the message at each end of one document of message.

If the receiver 200 correctly receives the data from the transmitter 100, it sends an MCF signal (not shown). So long as the data remains in the memory 208, the receiver 200 sends the MCF signal and the BUSY signal even after it received the EOM signal to prevent the transmission by the transmitter 100, and sends the READY signal when all of the data in the memory 208 have been supplied to the decoder 209.

The BUSY signal 308 and the READY signal 310 are sent from the modem 207 of the receiver 200 to the modem 105 of the transmitter 100 through a backward channel during the reception of the image data. A transmission band of the telephone line is 300 Hz–3400 Hz as shown by AA and a band occupied by the facsimile apparatus is 380 Hz–3080 Hz. Thus, band of 3100 Hz–3400 Hz can be used as the backward channel BC.

In the present invention, the BUSY signal 308 and the READY signal 310 are transmitted through this band at a low data rate, for example, 50 bits/second. Different frequencies may be used for those signals, or the same frequency may be used because the BUSY signal 308 is usually sent to the transmitter 100 during the transmission of the image data and the READY signal 310 is sent to the transmitter 100 during the interruption of the transmission of the image signal. Alternatively, the receiver 200 may continuously send the BUSY signal 308 and the READY signal 310 may be omitted.

Figure 4:
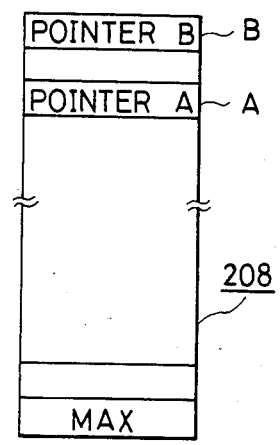
FIG. 4 shows a comfiguration of a memory shown in FIG. 1.

The memory control in the above operation is explained with reference to FIG. 4.

The memory 208 is a RAM (random access memory) and pointers A and B are provided in a memory area to control the memory. The pointer A points a memory address of a data to be next written to the memory 208, and the pointer B points a memory address of a data to be next read from the memory 208. The last address of the memory 208 is MAX and the memory 208 has a memory capacity large enough to store one page of size A4 standard document of coded data.

Figure 5:
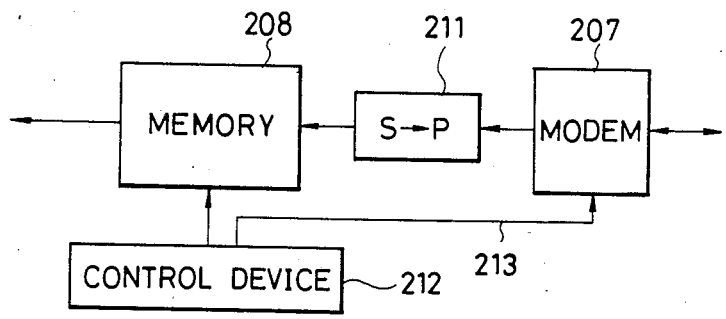
FIG. 5 is a block diagram of peripheral circuit of the memory.

FIG. 5 shows a peripheral circuit of the memory 208. A serial/parallel converter 211 is inserted between the modem 207 and the memory 208. The serial/parallel converter 211 functions to convert a serial data from the modem 207 to a parallel data. A control device 212 including a microcomputer is connected to the memory 208.

The memory 208 is controlled in a FIFO (first-in first-out) fashion and the data are written and read in the same time slot. A signal line 213 connected between the control device 212 and the modem 207 serves to instruct the transmission of the BUSY signal and the READY signal from the modem 207. It sends an instruction signal to the modem when the vacant area of the memory 208 is insufficient. It also sends the READY signal when the reception is accepted.

Figure 6:
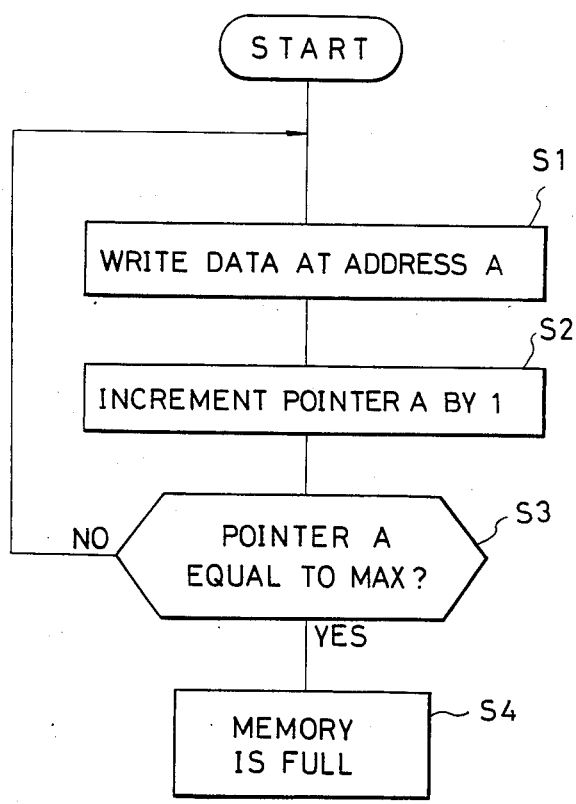
FIGS. 6 and 7 show flow charts for explaining a memory control method of the present invention.

FIG. 6 shows steps to write the data in the memory 208 from the modem 207 to the serial/parallel converter 211.

In a step Sl, the control device 212 writes the output data of the serial/parallel converter 211 to an address of the memory 208 pointed by the pointer A. In a step S2, the value of the pointer A is incremented by one, and the process goes to a step S3.

In the step S3, it is checked if the address pointed by the pointer A is the last address MAX of the memory 208 or an address which is a predetermined count before the last address. If the decision is YES, the full state of the memory 208 is determined in a step S4 and the BUSY signal 308 is sent to interrupt the data transmission of the transmitter. If the decision in the step S3 is NO, the process returns to the step Sl and repeats the above steps.

Figure 7:
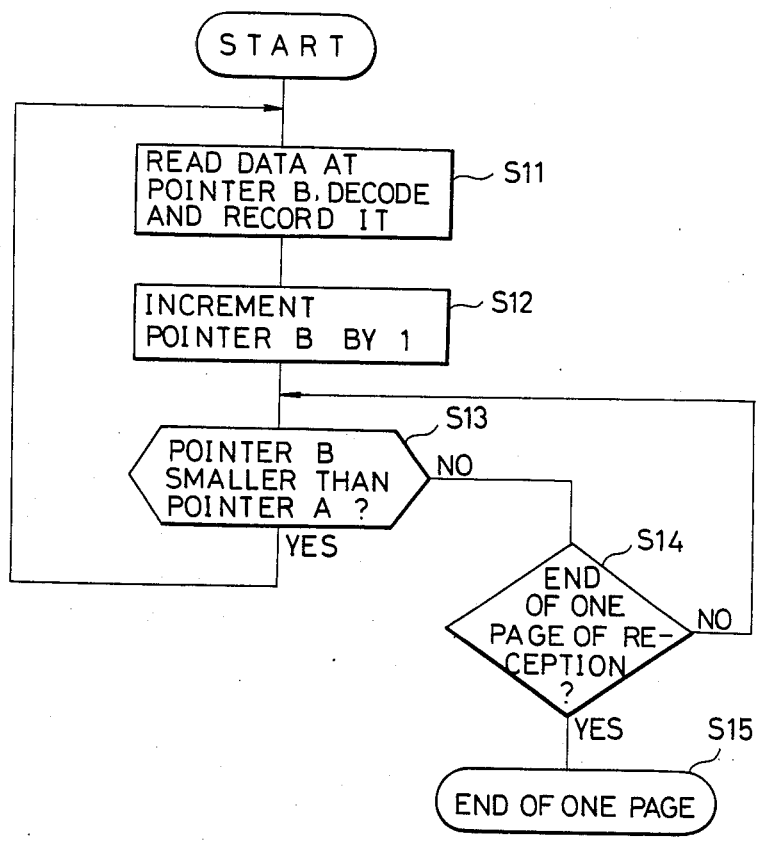

The read operation from the memory 208 is described with reference to FIG. 7.

In a step S11, the data at the address pointed by the pointer B is read and it is decoded by the decoder 209, and recorded by the recorder 210.

In a step S12, the value of the pointer B is incremented by one.

In a step S13, the value of the pointer B is compared with the value of the pointer A. Since the pointer A points the address to be next read, the value of the pointer B is not equal to the value of the pointer A if the record operation is not completed so long as the decoding and recording speed is shown than the transmission rate of the transmitter. Thus, by utilizing this fact, it is checked if all data in the memory 208 have been read and recorded. In the steps S11–S13 and the routine of the step S14, the decoding and recording operations are carried out and hence the BUSY signal 308 is sent.

When the decision in the step S13 is YES, it is regarded that the data remains in the memory 208 and the process returns to the step S11 to repeat the above steps to record the data. If the decision in the step S13 is NO, the process goes to the step S14 where it is checked if one page of data has been received or not.

The step S14 is provided for a case where the recording speed is faster than the transmission rate. In the step S14, if the EOM signal from the transmitter is not received and the transmission of one page of data has not been completed, the process returns to the step S13, and if the decision in the step S14 is YES, the process goes to a step S15 where the READY signal 310 is sent out to the line to terminate the receiving operation or receive the next page of data.

The BUSY signal and the READY signal may be of any formats. New data may be stored in a vacant memory area after the read operation.

In this manner, without significantly changing the method in accordance with the CCITT Recommendation, the BUSY signal is sent during the record operation of the receiver by using the dummy data and the READY signal is sent when the record operation is completed so that the next image message is transmitted. Thus, the data can be transmitted in a very short time. Accordingly, as shown in Figs.2A and 2B, when the document is one sheet long, the line may be disconnected after the end of the message. In this method, the inefficient process of inserting the dummy data is eliminated without significantly changing the method of the CCITT Recommendation and the line may be disconnected after the last document has been transmitted unless the memory of the receiver overflows. Thus, the telephone fee is reduced. In addition, since the terminal device can be operated at its own proper speed irrespective of the speed of other device, the system can comply with the advancement of the technology.

As described hereinabove, according to the present invention, the receiver having the image data memory records the image while it stores the image data transmitted from the transmitter in the memory, and when the predetermined amount of image data has been stored in the memory, the receiver sends the first signal indicating the incapability of processing the subsequent image data to the transmitter, and when the memory is capable of storing the image data, the receiver sends the second data indicating the capability of processing the next image data to the transmitter. Thus, the facsimile apparatus which can always efficiently transmit the image even when the processing speeds of the transmitter and the receiver are different is provided.

What I claim is:

1. A data receiving apparatus comprising:
   means for receiving data;
   memory means for storing the received data;
   means for reading the data stored in said memory means;
   recording means for recording the data from said reading means;
   detection means for generating a detection signal when the amount of the data stored in said memory means becomes equal to or more than a predetermined amount; and
   means for sending a control signal for interrupting data transmission to a partner data transmitting apparatus in response to the detection signal.

2. An apparatus according to claim 1, wherein the data is encoded image data and wherein said reading means includes means for decoding the read data.

3. An apparatus according to claim 1, further comprising second sending means for sending a second control signal for permitting re-start of data transmission to the partner data transmitting apparatus when said detection means detects a condition that the amount of the data stored in said memory means is equal to or less than a predetermined amount.

4. A data communication system comprising:
   (a) a data transmitter apparatus including:
      means for transmitting data; and
      transmission control means for interrupting a transmission operation of said transmitting means in response to a first control signal; and
   (b) a data receiver apparatus including:
      means for receiving data;
      memory means for storing the received data;
      means for reading and outputting the data stored in said memory means;
      means for detecting the amount of the data stored in said memory means; and
      means for sending the first control signal to said transmitter apparatus when said detection means detects a condition that the amount of the data stored in said memory means becomes equal to or more than a predetermined amount.

5. A system according to claim 4, wherein the data is encoded image data, wherein said data transmitter apparatus includes means for reading an original image and means for encoding an original signal generated by said reading means, and wherein said reading and outputting means includes means for decoding the read image data and means for recording the decoded image signal.

6. A system according to claim 4, wherein said sending means sends a second control signal to said data transmitter apparatus when said detection means detects a condition that the amount of the data stored in said memory means becomes equal to or less than a predetermined amount, and wherein said transmission control means resumes the transmission operation of said transmitting means in response to the second control signal.

7. A facsimile receiving apparatus comprising:
demodulation means for demodulating received image data;
memory means for storing the image data demodulated by said demodulation means;
decode means for reading out and decoding the image data stored in said memory means;
recording means for recording the image data decoded by said decode means;
control means for sending a control signal for interrupting image data transmission to control a partner facsimile transmitting apparatus when an information amount of the image data stored in said memory means reaches a predetermined amount.

8. A facsimile receiving apparatus according to claim 7, wherein said control means further sends a control signal to resume the transmission of the image data to the partner facsimile apparatus when said information amount is smaller than said predetermined amount.

9. A facsimile receiving apparatus comprising:
modem means for demodulating received image data and modulating a control signal to be transmitted;
memory means for storing the image data demodulated by said modem means;
control means for sending a first signal indicating that the image data cannot be processed from said modem means to a partner facsimile transmitting apparatus through a backward channel when said memory means stores more than a predetermined amount of the image data, and sending a second signal indicating that the image data can be processed from said modem means to the partner transmitting apparatus through said backward channel when said memory means stores less than said predetermined amount of the image data and can store new image data, to control an information amount of the image data stored in said memory means; and
record means for recording the image data stored in said memory means.

10. A facsimile apparatus according to claim 9, wherein said first signal and said second signal sent by said control means from said modem means through said backward channel are of the same frequency.

11. A facsimile apparatus according to claim 9, wherein said control means sets the information amount of the image data stored in said memory means such that said first signal is sent at a timing to prevent an overflow of said memory means by the image data received between the send-out of said first signal from said modem means and the detection of interruption of the image data.

* * * * *

UNITED STATES PATENT AND TRADEMARK OFFICE
CERTIFICATE OF CORRECTION

PATENT NO. : 4,672,460　　　　　　　　　　　　　Page 1 of 2
DATED     : June 9, 1987
INVENTOR(S): SHIN TSUDA It is certified that error appears in the above-identified patent and that said Letters Patent is hereby corrected as shown below:

COLUMN 1

Line 37,    "time" should read --times--.
    Line 40,    "th" should read --the--.

COLUMN 2

Line 21,    "comfiguration" should read --configuration--.
    Line 24,    "memory ,and" should read --memory, and--.
    Line 65,    "A" should read --a--.

COLUMN 3

Line 4,    "successes" should read --succeeds with--.
    Line 58,    "successes" should read --succeeds with--.

COLUMN 5

Line 33,    "shown" should read --slower--.

UNITED STATES PATENT AND TRADEMARK OFFICE
CERTIFICATE OF CORRECTION

PATENT NO. : 4,672,460  
DATED : June 9, 1987  
INVENTOR(S) : SHIN TSUDA

Page 2 of 2

It is certified that error appears in the above-identified patent and that said Letters Patent is hereby corrected as shown below:

COLUMN 6

Line 6, "of other" should read --of the other--.  
Line 17, "data" should read --signal--.

Signed and Sealed this

Sixth Day of October, 1987

Attest:

DONALD J. QUIGG

Attesting Officer

Commissioner of Patents and Trademarks